J. H. LEE.
Coffee Pot.
No. 51,198. Patented Nov. 28, 1865.
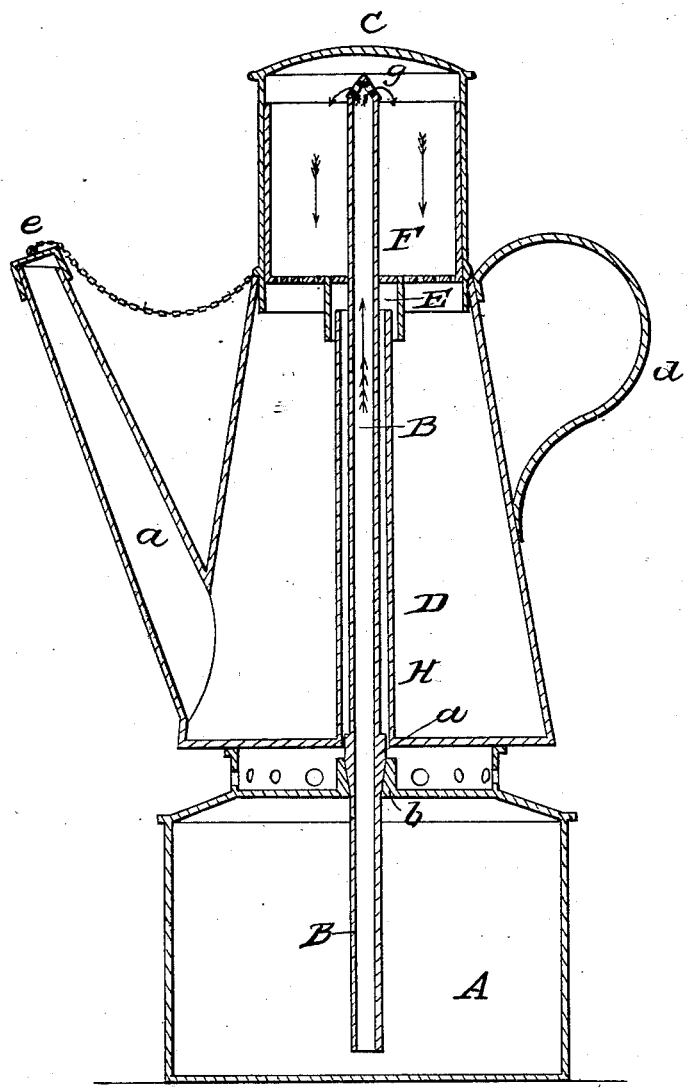
Witnesses
D. P. Hall Jr.
G. H. Washburn.
Inventor
James H Lee.
by his attorney.
R. H. Eddy.

UNITED STATES PATENT OFFICE.

JAMES H. LEE, OF CHARLESTOWN, MASSACHUSETTS.

IMPROVEMENT IN COFFEE-POTS.

Specification forming part of Letters Patent No. 51,198, dated November 28, 1865.

*To all whom it may concern:*

Be it known that I, JAMES H. LEE, of Charlestown, in the county of Middlesex and State of Massachusetts, have invented an Improved Cafetière or Apparatus for Making Decoctions of Coffee or other matters; and do hereby declare the same to be fully described in the following specification, and represented in the accompanying drawing, which is a vertical section of it.

In such drawing, A denotes a boiler or close vessel provided with a neck or valve-seat, $b$, to receive a plug or valve, $a$, affixed to or surrounding an upright tube, B, and serving, when fixed in the neck $b$, to sustain such tube with its lower end at a short distance from the bottom of the boiler A.

Above the boiler A and resting thereon is a pot or vessel, D, provided with a discharging-spout, $a$, and a handle, $d$, such spout having a cover, $e$, to fit on its end. The pot D is constructed with a tube, H, to extend up from its bottom, and to open through the same and surround the tube B, and terminate near the upper part of the pot.

Over the said pot D is a coffee holder or vessel, F, into which the tube B extends, and to the bottom of which it is fastened, such bottom being foraminous and provided with a tubular cap, E, to encompass or close on the upper part of the tube H.

A cylindrical cover, C, incloses the vessel and fits into the mouth of the pot D.

The upper end of the tube B consists of a forminous case, $g$.

To make a decoction of coffee with the above-described apparatus, the ground coffee is to be placed within the holder F and the charge of water within the boiler A. On heat being applied to the outside surface and so as to make steam within the boiler, the pressure of such steam on the water will cause the latter to be driven up the tube B and discharged upon the mass of coffee, through which it will percolate, and finally pass into the pot D in the state of a decoction.

By separating the vessel F and tube B from the boiler A and the pot D, and the latter from the boiler, we are enabled to use the coffee-pot without such accessories.

I claim—

1. The combination as well as the arrangement of the boiler A, the plug $a$, and its seat $b$, the pipe B, the coffee-holder F, and the pot D.

2. The combination as well as the arrangement of the tube H, with the pot D, the tube B, the vessel F, the plug $a$, the neck or seat $b$, and the boiler A.

3. The combination as well as the arrangement of the cap or cover C, the coffee-holder F, the pot D, the pipe H, the tube B, and the boiler A.

4. The combination as well as the arrangement of the cap E, the tube H, the pot D, the vessel F, and the boiler A.

JAMES H. LEE.

Witnesses:
R. H. EDDY,
F. P. HALE, Jr.